(12) United States Patent
Narita et al.

(10) Patent No.: US 6,858,144 B2
(45) Date of Patent: Feb. 22, 2005

(54) METHOD AND APPARATUS FOR TREATMENT OF WASTEWATER

(75) Inventors: Koki Narita, Osaka (JP); Masanori Sugisawa, Kobe (JP); Hiroyuki Chifuku, Nishinomiya (JP); Takayoshi Doi, Kobe (JP); Hiroki Yamaji, Kobe (JP); Yoshikazu Takai, Matsusaka (JP)

(73) Assignees: Sharp Kabushiki Kaisha, Osaka (JP); Shinko Pantec Co., Ltd., Kobe (JP)

(*) Notice: Subject to any disclaimer, the term of this patent is extended or adjusted under 35 U.S.C. 154(b) by 0 days.

(21) Appl. No.: 09/969,767

(22) Filed: Oct. 4, 2001

(65) Prior Publication Data

US 2002/0038784 A1 Apr. 4, 2002

(30) Foreign Application Priority Data

Oct. 4, 2000 (JP) ........................................ 2000-304532
Aug. 8, 2001 (JP) ........................................ 2001-240459

(51) Int. Cl.$^7$ ................................................. C02F 3/06
(52) U.S. Cl. ........................ 210/617; 210/150; 210/908
(58) Field of Search .............................. 210/150, 151, 210/209, 262, 614, 617, 908

(56) References Cited

U.S. PATENT DOCUMENTS

| | | | | |
|---|---|---|---|---|
| 3,968,034 A | * | 7/1976 | Tymoszczuk | ............... 210/151 |
| 4,086,167 A | * | 4/1978 | Tapola et al. | ............... 210/150 |
| 4,915,841 A | * | 4/1990 | Lagana et al. | ............... 210/617 |
| 5,019,268 A | * | 5/1991 | Rogalla | ....................... 210/151 |
| 5,147,547 A | * | 9/1992 | Savall et al. | ................. 210/150 |
| 5,529,693 A | * | 6/1996 | Yano et al. | .................. 210/614 |
| 5,543,039 A | * | 8/1996 | Odegaard | ..................... 210/150 |
| 5,895,576 A | * | 4/1999 | Yamasaki et al. | ............ 210/617 |
| 6,395,522 B1 | * | 5/2002 | DeFilippi et al. | ............ 210/617 |

FOREIGN PATENT DOCUMENTS

JP 2769973 4/1998

* cited by examiner

*Primary Examiner*—Christopher Upton
(74) *Attorney, Agent, or Firm*—Oblon, Spivak, McClelland, Maier & Neustadt, P.C.

(57) ABSTRACT

The present invention provides a method for treatment of wastewater containing organic sulfur compounds The method includes introducing the wastewater into an apparatus body equipped with a fixed bed in which fixed carriers for the attachment of microorganisms are filled and a fluidized bed in which flowing carriers for the attachment of microorganisms are flown, and enabling the wastewater to flow through the fluidized bed towards the fixed bed so that the wastewater is biologically treated by the fluidized bed and the fixed bed.

18 Claims, 7 Drawing Sheets

METHOD AND APPARATUS FOR TREATMENT OF WASTEWATER

BACKGROUND OF THE INVENTION

1. Field of the Invention

This invention relates to a method and an apparatus for treatment of wastewater, and more particularly, a method for biologically decomposing wastewater containing organic sulfur compounds such as dimetyl sulfoxide (hereinafter referred to DMSO), and an apparatus for carrying out such decomposition.

2. Description of the Prior Art

Accompanying recent introduction of DMSO as release agents and cleaning agents in the field of the electronic industry, needs for decomposing of DMSO are increasing. For such needs, the present inventors have developed a biological treatment method of decomposing DMSO, as described in Japanese Patent No. 2769973.

Generally employed as a method for biological treatment of wastewater containing organic compounds are fluidized-bed and fixed-bed biological treatment methods.

The fluidized-bed biological treatment method is carried out by using flowing carriers for the attachment of microorganisms flowing in a bioreactor. According to this type of the treatment, the excess microorganisms are discharged as suspended matters along with treated water. This poses a common problem that an equipment for removing suspended matters in the treated water is increased in size.

DMSO itself has a high permeability and acts as a release agent, so that where an organic compound contained in the wastewater is DMSO, the fluidized-bed biological treatment of such wastewater brings the flowing carriers into such a state as if they are washed by the releasing agent under the continuous flow of the flowing carriers in the bioreactor. Consequently, there arises a problem inherent to the treatment of the wastewater containing DMSO that microorganisms are relatively easily released from the carriers as compared with the treatment of wastewater containing a different organic matter.

On the other hand, the fixed-bed biological treatment of wastewater containing organic sulfur compounds such as DMSO causes generation of sulfuric acid and hence lowers the pH due to an organic sulfur compound contained in the wastewater, as the decomposition of the organic sulfur compounds proceeds.

The fixed-bed biological treatment also provides a plug flow of wastewater, so that the pH is lowered as the wastewater fed into a wastewater inflow region moves through the fixed bed to be subjected to the biological treatment.

Because of this, as the biological treatment of wastewater containing organic sulfur compounds proceeds, the pH is lowered and unevenly distributed within the apparatus even if the pH of the wastewater at the wastewater inflow region is adjusted to a pH suitable for the biological treatment. Consequently, the apparatus may have a deteriorated biological treatment condition and hence is unlikely to obtain a high treatment capability.

As a result of insufficient treatment capability, there arises a problem that the organic sulfur compounds may not be sufficiently decomposed, resulting in the generation of odor.

The aforesaid Japanese Patent No. 2769973 addresses the lowering of the pH by partly circulating treated water and stabilizing the pH. To do this, however, an equipment for circulation of treated water must be installed.

In either case, the problems involved in both the fluidized-bed and fixed-bed biological treatments may not be solved even by the invention of the Japanese Patent No. 2769973.

It is an object of the present invention to provide a method and apparatus for treatment of wastewater containing organic sulfur compounds that achieves an excellent treatment efficiency, which may not be available through a conventional method or apparatus, while omitting the necessity to install an equipment for circulating a part of treated water, and solving problems involved in employing the conventional fluidized-bed or fixed-bed biological treatment method.

SUMMARY OF THE INVENTION

According to one aspect of the present invention, there is provided a method for treatment of wastewater containing organic sulfur compounds that includes introducing the wastewater into an apparatus body equipped with a fixed bed in which fixed carriers for the attachment of microorganisms are filled and a fluidized bed in which flowing carriers for the attachment of microorganisms are flown, and enabling the wastewater to flow through the fluidized bed towards the fixed bed so that the wastewater is biologically treated by the fluidized bed and the fixed bed.

According to another aspect of the present invention, there is provided an apparatus for treatment of wastewater containing organic sulfur compounds that includes an apparatus body into which the wastewater is introduced, a fixed bed disposed within the apparatus body and provided therein with fixed carriers for the attachment of microorganisms, a fluidized bed disposed within the apparatus body and provided therein with flowing carriers for the attachment of microorganisms, in which the fixed bed and the fluidized bed are so arranged that the wastewater flows through the fluidized bed towards the fixed bed.

The method and apparatus of the present invention allows the wastewater to flow through the fluidized bed towards the fixed bed, so that microorganisms increased on the flowing carriers and released therefrom are captured by the fixed bed.

The flowing carriers continuously flow within the fluidized bed and therefore enhances a contact efficiency of oxygen and wastewater to be treated. This enables rapidly increase of microorganisms and enhances the attachment of microorganisms on the surfaces of the flowing carriers. An excessive amount of microorganisms released from the flowing carriers are continuously fed to the fixed bed. As a result, the amount of microorganisms held by the fixed carriers is increased, so that the treatment capability per unit volume in the entire apparatus is improved.

The fluidized bed is preferably arranged on the fixed bed, thereby causing a downward flow of the wastewater which flows through the fluidized bed towards the fixed bed.

According to the apparatus of the present invention which enables the downward flow of the wastewater to flow through the fluidized bed toward the fixed bed by the arrangement with the fluidized bed disposed on the fixed bed, microorganisms, suspended matters and the like built up on the surfaces of the fixed carriers in the fixed bed are released or scraped away by the flowing carriers flowing in the fluidized bed. As a result, the build-up of microorganisms on the surfaces of the fixed carriers is preferably prevented, thus achieving the increase in filtration resistance.

Since microorganisms or suspended matters are hardly built up on the surface of the fixed bed 2 as described above, microorganisms increased on and released from the flowing carriers are easy to intrude into the inside of the fixed bed. Consequently, the amount of microorganisms held by the fixed bed is increased, thereby achieving an improved treatment capability.

Sulfuric acid is also generated in the fluidized bed as a result of the decomposition of a part of the organic sulfur compounds by the fluidized bed. To prevent lowering of the pH due to the generation of sulfuric acid generated in the fluidized bed, alkalis are added into the fluidized bed portion to adjust the pH to a value suitable for biological treatment. This more effectively limits the lowering of the pH in the fixed bed as compared with the sole arrangement of the fixed bed, so that the pH can be stabilized without the necessity to circulate the treated water, and the inside of the fixed bed is brought into a condition facilitating the increase of microorganisms. As a result, a relatively high treatment capability can be possessed.

Where several treatment apparatus are installed, alkalis may be added into the wastewater prior to the introduction of the wastewater into these apparatus for proper adjustment of the pH. It is more preferable to take a step or dispose a means of measuring the pH of the fluidized bed and adjust the amount of alkalis.

As an additional advantage, proper decomposition of the organic sulfur compounds prevents the generation of odors.

BRIEF DESCRIPTION OF THE DRAWINGS

The above, and other objects, features and advantages of the present invention will become apparent from the detailed description thereof in conjunction with the accompanying drawings wherein.

DETAILED DESCRIPTION OF THE PREFERRED EMBODIMENTS

Embodiment

The description will be made for an apparatus for treatment of wastewater containing DMSO as an organic sulfur compound according to one embodiment of the present invention in conjunction with the drawings attached hereto.

Figure 1:
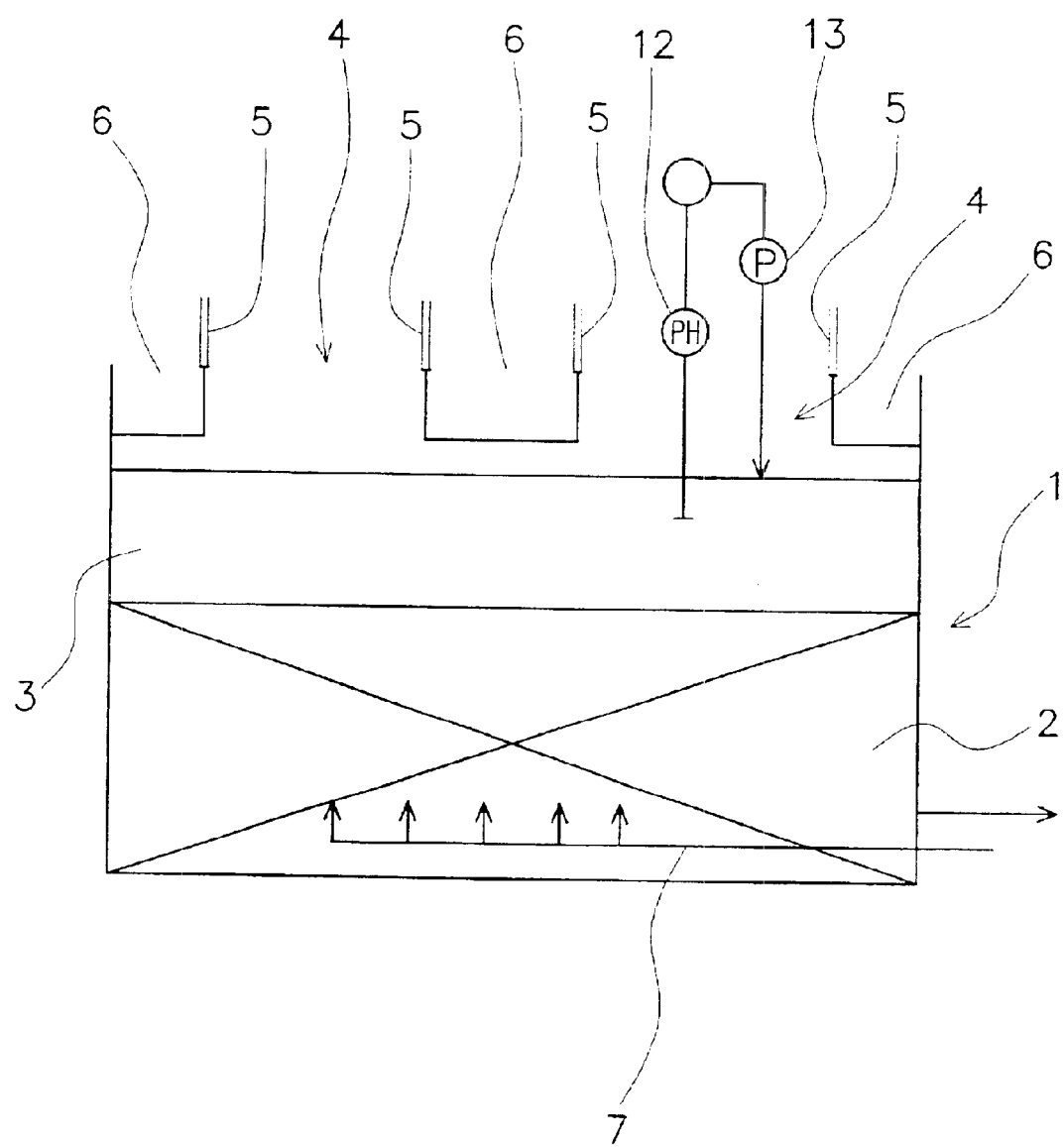
FIG. 1 is a schematic side view of a wastewater treatment apparatus according to one embodiment of the present invention.

Referring to FIG. 1, the wastewater treatment apparatus includes apparatus body 1 that in turn includes fixed bed 2 and fluidized bed 3 disposed on the fixed bed 2.

In the vicinity of the fluidized bed 3 is provided pH meter 12 and pH adjustment pump 13. Backwash troughs or backwash water collection passages 6 are also disposed in the vicinity of the fluidized bed 3 to allow the inflow of backwash wastewater thereinto. For this purpose, the wastewater is forced to rise up to the upper region 4 of the apparatus.

Outflow blocking walls 5 as a means for blocking the outflow of flowing carriers in the backwash wastewater are respectively mounted to the troughs 6. The outflow blocking walls 5 each have a meshed construction formed by a woven metal wire, punching metal, slits or the like to have openings, through which the backwash wastewater passes. The opening diameter, slit width or any other corresponding size of an opening of each outflow blocking wall 5 is less than 10 mm in this embodiment. This size may be varied as far as the flowing carriers can be trapped by the respective outflow blocking walls 5.

Air pipe 7 is disposed in a lower region of the fixed bed 2 to feed air into the fixed bed for aeration and backwash.

The amounts of the flowing carriers and the fixed carriers respectively filled in the fluidized bed 3 and the fixed bed 2 are preferably set in a volume ratio of between 1:20 and 20:1, and more preferably between 9:1 and 1:9.

Figure 2A:
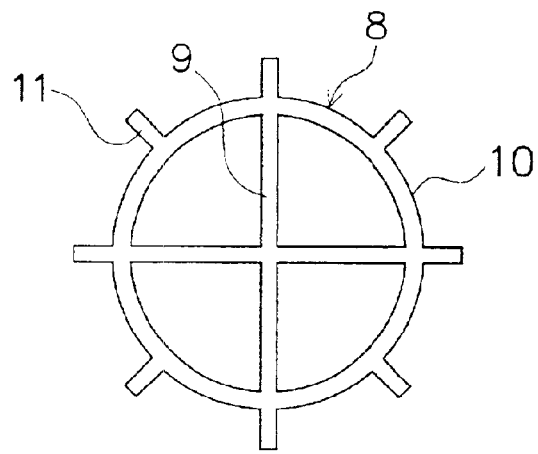
FIGS. 2A–2C are respectively a front view, side view and perspective view of a flowing carrier according to one embodiment of the present invention.
Figure 2B:
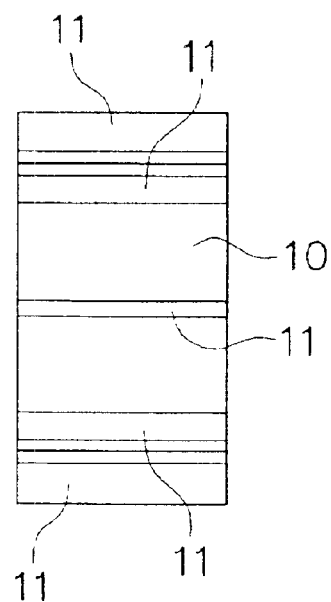
Figure 2C:
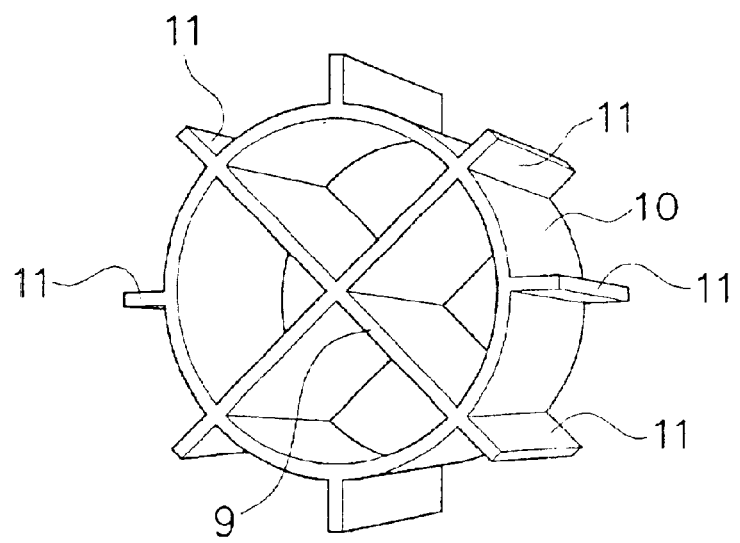

As illustrated in FIGS. 2A and 2C, the flowing carriers 8 each have a center portion 9 having a substantially cruciform shape, a peripheral portion 10 having a substantially circular shape, and fins 11 (eight fins in this embodiment) that are arranged with predetermined spacing each other along the circumferential surface of the circular peripheral portion 10. The circular peripheral portion 10 has a predetermined width along its entire circumference, as illustrated in FIG. 2B. Each flowing carrier 8 has a specific gravity of 0.90–1.20, and a width of 10 mm as viewed in FIG. 2B.

The cruciform center portion 9, the circular peripheral portion 10 and the fins 11 thus expand the entire surface area of the flowing carrier 8, thereby enhancing the attachment of microorganisms on the flowing carrier 8.

A material of the flowing carriers 8 is properly selected from conventional synthetic resins such as polypropylene and polyethylene.

The fixed carriers each have a spherical shape made of a porous ceramic material with a diameter of 5–10 mm.

Now, the description will be made for the embodiment of a treatment process of wastewater containing DMSO.

Figure 3:
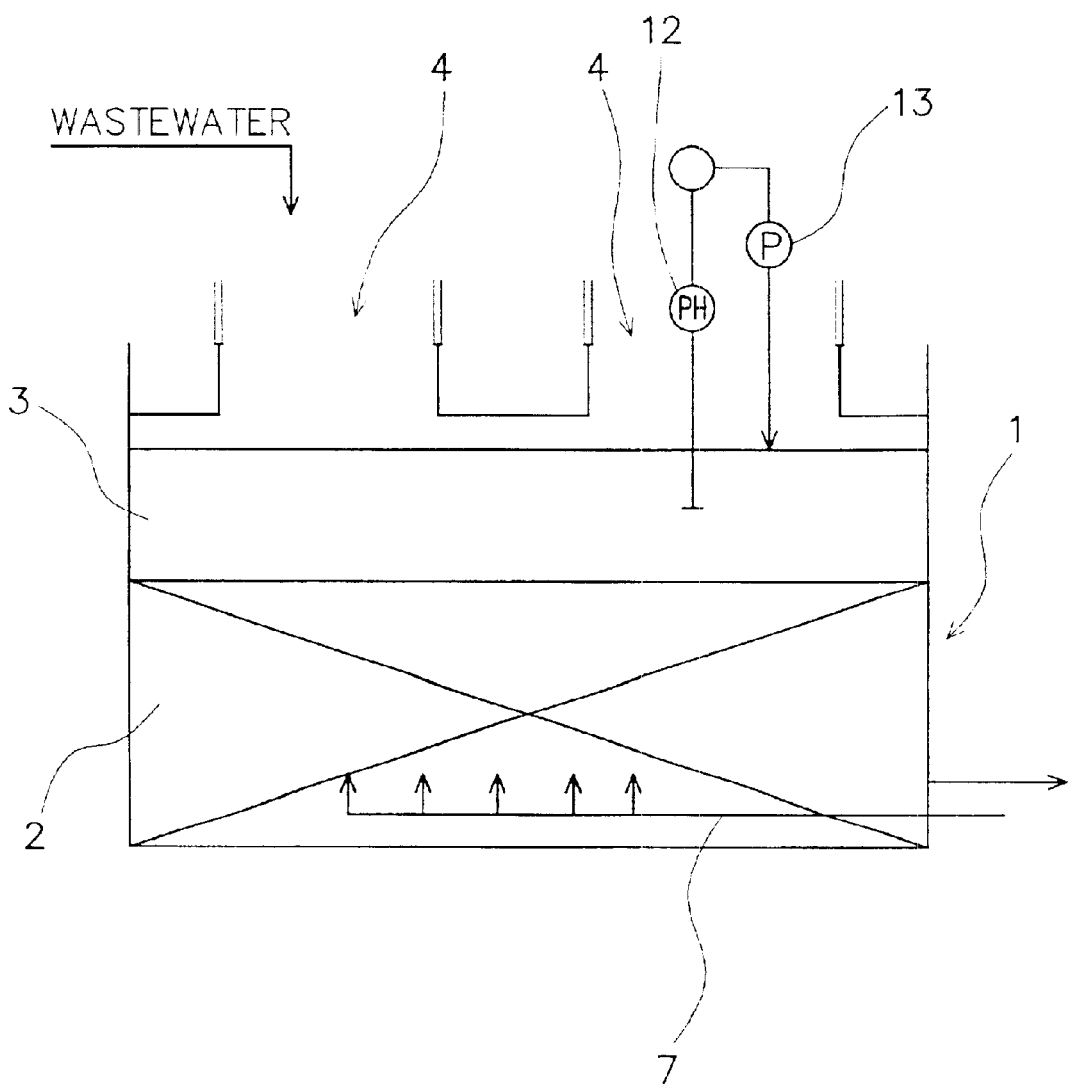
FIG. 3 is a schematic side view illustrating a wastewater flow path.

Referring to FIG. 3, wastewater containing DMSO discharged from a factory or any other facilities is introduced into the apparatus body 1 through an inlet region 4. The wastewater introduced into the apparatus body 1 flows through the fluidized bed 3, then reaches the fixed bed 2, and then is discharged to the outside as treated water through the fixed bed 2. In this arrangement, the fixed bed 2 is disposed under the fluidized bed 3 so that microorganisms released from the flowing carriers 8 are captured by the fixed bed 2, thereby reducing suspended matters contained in the treated water.

The flowing carriers continuously flow within the fluidized bed 3 by the movement of the wastewater. This continuous flow enhances a contact efficiency of oxygen and the wastewater, enabling rapid increase of microorganisms, and enhances the attachment of microorganisms on the surfaces of the flowing carriers. Excessive microorganisms released from the flowing carriers are continuously fed to the fixed bed. As a result, the amount of microorganisms held by the fixed carriers is increased, so that the treatment capability per unit volume possessed by the entire apparatus is improved.

DMSO is decomposed to some extent in the fluidized bed 3, which decomposition generates sulfuric acid and hence lowers the pH in the fixed bed 2. This lowering of the pH or variation of the pH in the fixed bed 2 can be limited by the pH meter 12 and the pH adjustment pump 13 which are designed to adjust the pH of the wastewater to a value suitable for biological treatment or adjust the same to a neutral value or its approximate value.

As an alternative to the above, it is possible to add in advance alkalis into the wastewater to enable the pH in the fluidized bed to have a value suitable for the biological treatment.

Next, the fixed bed 2 with the suspended matters captured therein must be properly backwashed by feeding air through the air pipe 7 and then feeding the backwash water through a treated water collecting pipe. This correcting pipe is designed to transfer treated water during normal operation, and backwash water during the backwash operation. According to this arrangement, the arrangement which separates the air pipe from the treated water collecting pipe is not essential. Instead, they may be formed integrally with each other. Also, these pipes do not necessarily have a rounded cross section.

The microorganisms released from the fixed bed 2 by a proper backwashing operation flow towards the fluidized bed 3 and are partly attached onto the same, and more particularly on the surfaces of the flowing carriers, so that the flowing carriers which usually do not carry a sufficient amount of the microorganism at initial start-up of the apparatus can instantly and sufficiently carry microorganisms through the backwash operation.

While microorganisms are easily released from the flowing carriers during the treatment of wastewater containing a releasing agent such as DMSO, the backwashing facilitates the attachment of the microorganisms to the flowing carriers 8, and hence preferably increases an amount of microorganisms attached thereto.

Figure 4:
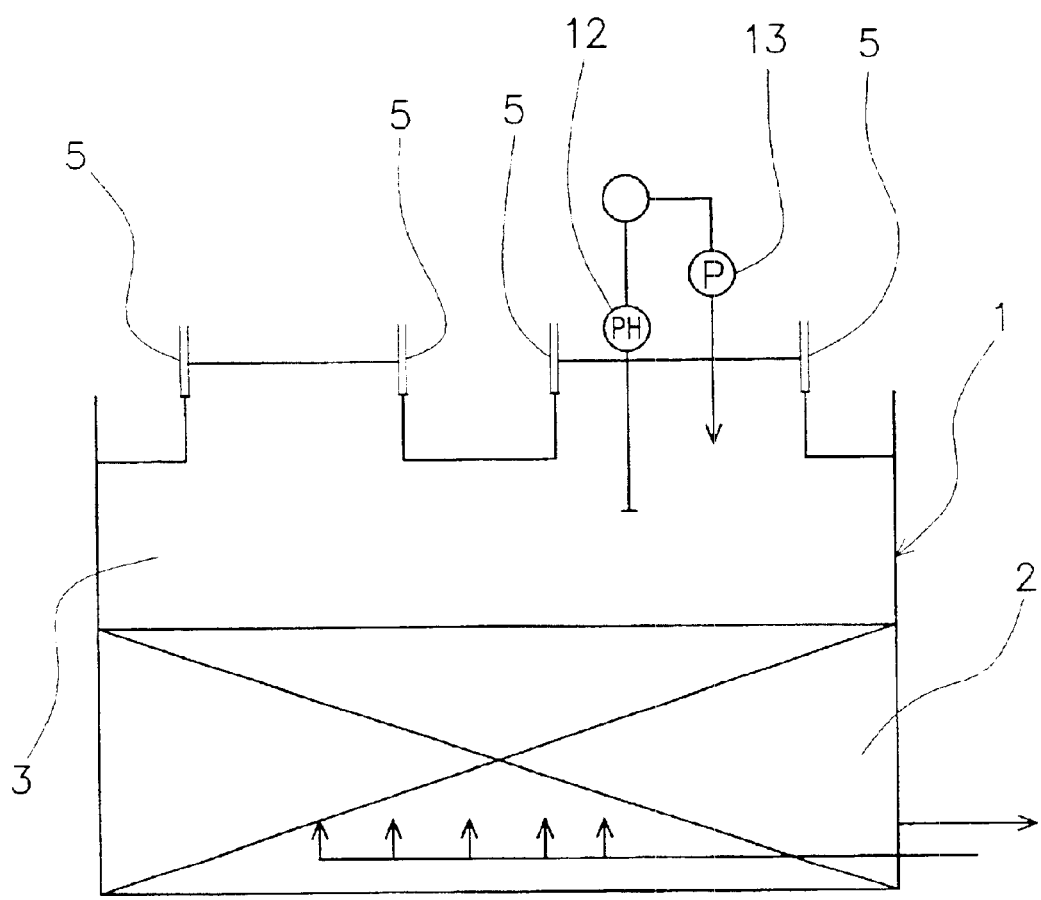
FIG. 4 is a schematic side view illustrating the wastewater which rises upwards for the backwash operation.
Figure 5:
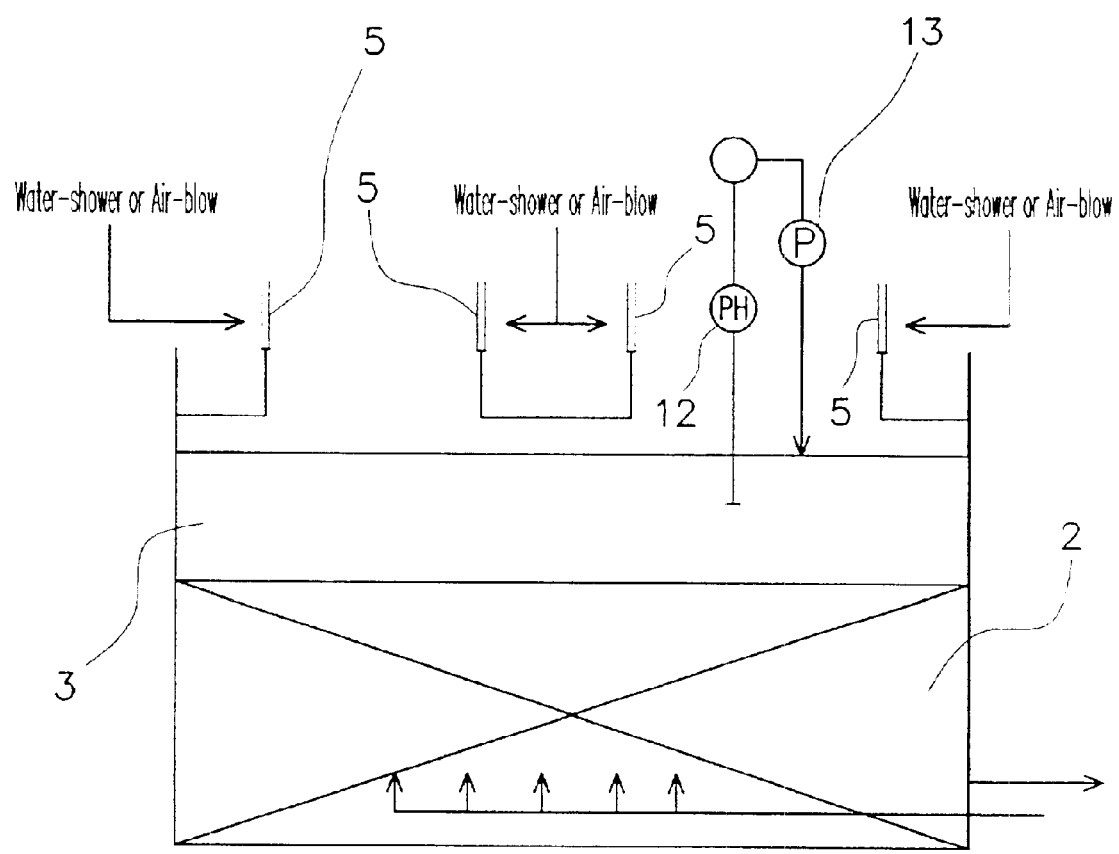
FIG. 5 is a schematic side view illustrating a water showering process.

As illustrated in FIG. 4, the outflow blocking walls 5 provided in the upper region of the apparatus body 1 can block the outflow of the flowing carriers, which are moved upward along with the backwash water rising up within the apparatus body 1 to a level near the upper end of the apparatus body 1. More specifically, the size of each opening of the outflow blocking walls 5 is limited to such a size as to enable the outflow blocking wall 5 to trap the flowing carriers and hence block the outflow of the flowing carriers 8 through the openings to the outside.

Subsequent to the backwashing operation, water is showered on the surfaces of the outflow blocking walls 5 to wash away the flowing carriers trapped on the outflow blocking walls 5 onto the fluidized bed 3. Thus, the outflow blocking walls 5 can properly block the outflow of the flowing carriers to the outside of the fluidized bed 3 even during the backwash operation.

Instead of water showering, air may be blown against the outflow blocking walls 5. The blowing air also forces the flowing carriers to fall onto the fluidized bed 3.

Figure 6:
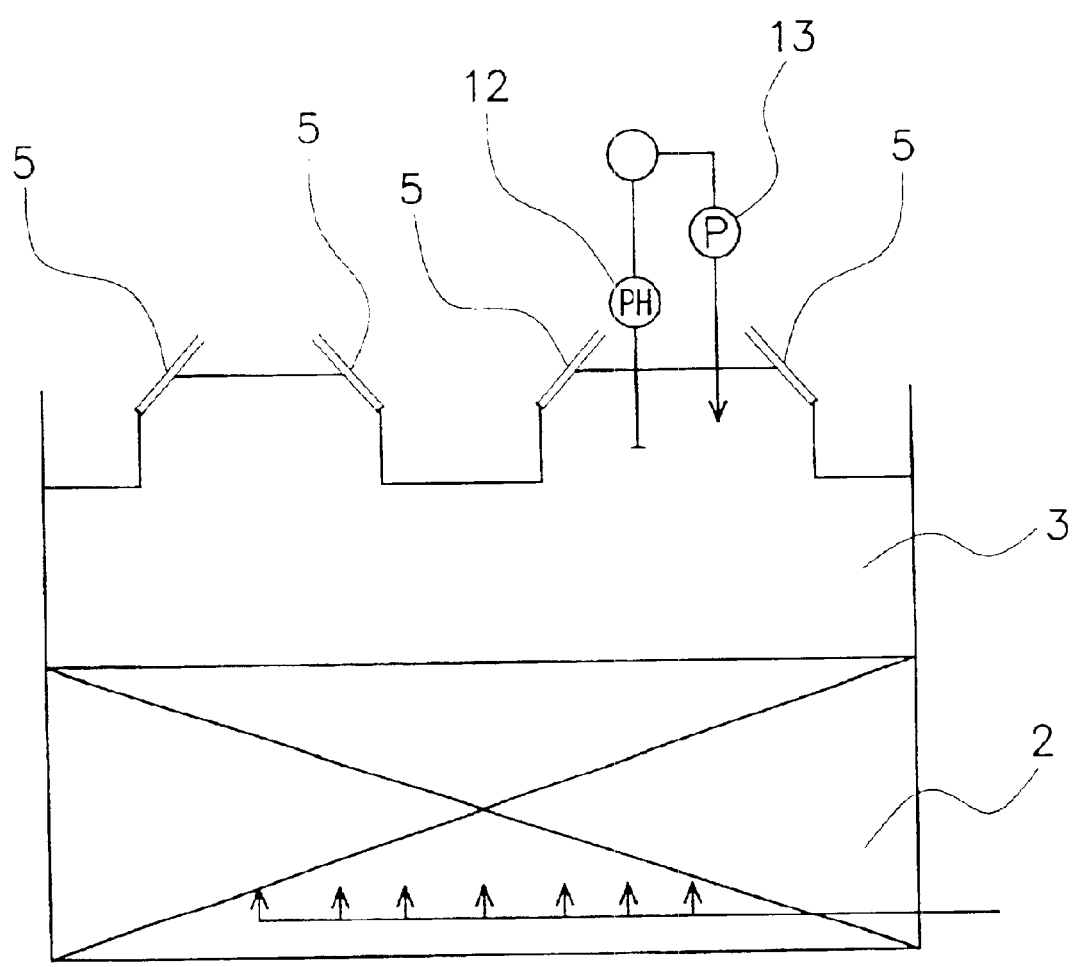
FIG. 6 is a schematic side view of a wastewater treatment apparatus according to another embodiment of the present invention.
Figure 7:
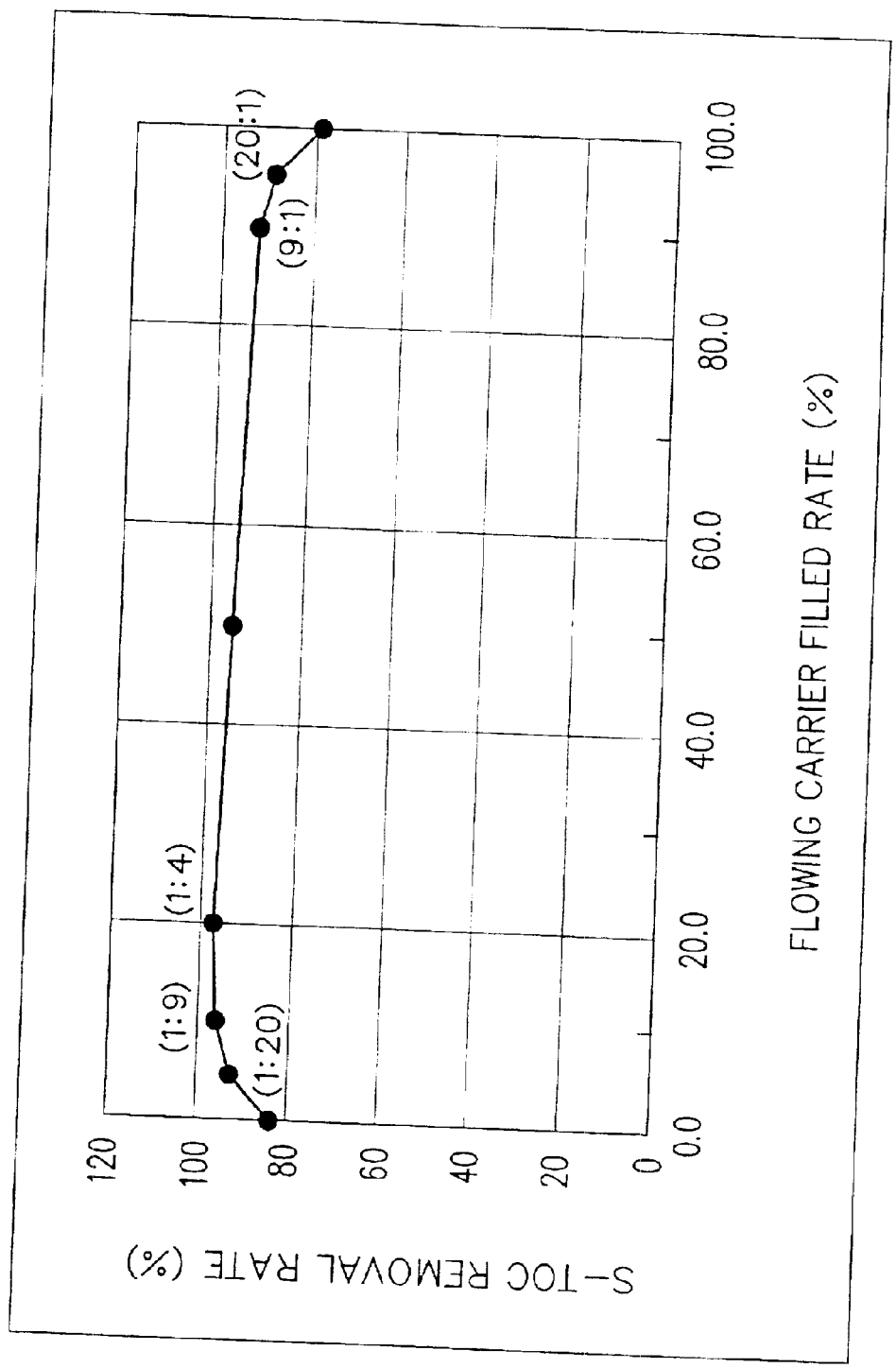
FIG. 7 is a graph showing the relationship between the TOC removal rate and the flowing carrier filled rate.

It is to be noted that means of returning the flowing carriers from the outflow blocking walls 5 to the fluidized bed 3 is not necessarily limited to the showering water or blowing air. Any means may be employed for this function. For example, it is possible to have the outflow blocking walls 5 tilted inwardly, as illustrated in FIG. 6. That is, the outflow blocking walls 5 of FIG. 6 are disposed in the apparatus body 1 in such a manner as to respectively have slanting surfaces, along which the flowing carriers attached thereon during the backwash operation spontaneously move downward as the time lapses. Accordingly, they fall into the fluidized bed 3 without a necessity to employ an additional mechanism or device. Thus, the flowing carriers can be returned by a tilting arrangement of the outflow blocking walls 5, while being prevented from flowing out of the fluidized bed 3.

A varying shape may be employed for each flowing carrier 8 made up of the cruciform center portion 9, the circular peripheral portion 10 surrounding the cruciform center portion 9 and the fins 11 arranged with predetermined spacing each other along the circumferential surface of the circular peripheral portion 9. For example, a varying number (e.g., 4, 8, 10, 12, 16, 20) of the fins 11 may be arranged on the peripheral portion 9. It is also possible to employ the flowing carriers 8 having no fins, although the fins 11 facilitate the rotation of each flowing carrier 8, resulting in an improved flowability of the flowing carriers 8. Considering the flowability and ease of shaping of the flowing carriers 8, it is preferable to arrange about 8 to 20 fins on the peripheral portion 9.

The cruciform center portion 9 may be of any other shape. However, the center portion having a substantially cruciform shape effectively expands the entire surface area of each flowing carrier 8, hence achieving an increased amount of microorganisms attached thereto.

On the other hand, the center portion having an excessively complicate shape may invite clogging of openings or clearances defined in each flowing carrier 8. Accordingly, the shape of the center portion 9 is preferably determined upon considering the relative merits of expansion of the surface area and solving the clogging problem.

The circular peripheral portion 10 may be of a varying shape such as a substantially rectangular or octagonal shape, although the peripheral portion 10 having a substantially circular shape facilitates the rotation of each flowing carrier 8, resulting in an improved flowability of the flowing carriers 8.

In any case, it is preferable to determine the respective shapes of the center portion 9, the peripheral portion 10, etc., the number and shape of the fins 11, and the like in consideration of all those factors such as the size of the surface area, the flowability effected by the rotation of the flowing carriers 8, possibility of plugging, ease in moulding, and the like.

Further, the flowing carriers 8 each preferably have a diameter of 0.1–3.0 cm at a diametrically smallest portion. However, the flowing carriers 8 each are not necessarily limited to this size. That is, it is possible to employ a varying size of the flowing carriers 8, provided that the flowing carriers 8 can be securely trapped by the outflow blocking walls 5, or set the diameter of each flowing carrier to be larger than the diameter of each opening of the outflow blocking walls 5.

The flowing carriers 8 which are made of a synthetic resin in this embodiment may be made of a varying material. However, a material enabling the carriers to facilitate the attachment of microorganisms thereon and hold the microorganisms of a high concentration is preferably employed. In this regard, the synthetic resin is suitable for use as a material of the flowing carriers 8 since it produces ease of shape-forming, and achieves a low cost manufacture.

The fixed carriers each having a spherical shape in this embodiment may be of a varying shape, and the material thereof is also not limited to ceramic. Of various materials, a porous material is preferable for use as a material of the fixed carriers. The fixed carriers each may have a varying size. However, the fixed carriers each having a diameter of 5–10 mm may be suitable.

In the above embodiment, the fluidized bed 3 is arranged on the fixed bed 2, so that a downward flow of the wastewater can pass both the fluidized and fixed beds. However, the relative positioning of these beds may be varied. For example, the fixed bed 2 may be arranged on the fluidized bed 3, so that a upward flow of the wastewater can pass both beds. However, considering an efficient treatment of the wastewater, the arrangement with the fluidized bed 3 disposed on the fixed bed 2 is preferably employed, since it utilizes the downward flow, which is spontaneously generated It is also possible to use the method and apparatus for treatment of wastewater of the present invention in treating wastewater containing organic sulfur compound other than DMSO.

EXAMPLES

Wastewater containing DMSO of 500 mg/L(litter) and organic components such as isopropyl alcohol was treated. The wastewater has a TOC (total organic carbon) of 197 mg/L. This water was treated by treatment apparatus of Examples 1–6, and Comparative Examples 1 and 2. The DMSO content of the treated wastewater in each apparatus, and a S-TOC (soluble total organic carbon) concentration was measured to determine a treatment capability in each Example.

The amount of the wastewater to be treated was 380 litters per day, and the load was 0.5 kgTOC/m$^3$.

Example 1

In this example, a treatment apparatus with the flowing carriers of 7.1 L and the fixed carriers of 142.9 L filled therein (i.e., the ratio of the fluidized bed to the fixed bed was 1:20) was used. As a result of treating the wastewater containing DMSO by the treatment apparatus of this example, the DMSO content in the treated water was 25 mg/L. The S-TOC concentration was 15 mg/L. Accordingly, the TOC removal rate was 92.4%. The pH of the apparatus in its region corresponding to the fluidized bed was 7.2, while the pH of the treated water was 6.5.

Example 2

In this example, a treatment apparatus with the flowing carriers of 15 L and the fixed carriers of 135 L filled therein (i.e., the ratio of the fluidized bed to the fixed bed was 1:9) was used. As a result of treating the wastewater containing DMSO by the treatment apparatus of this example, the DMSO content in the treated water was 6 mg/L. The S-TOC concentration was 8 mg/L. Accordingly, the TOC removal rate was 95.9%. The pH of the apparatus in its region corresponding to the fluidized bed was 7.2, while the pH of the treated water was 6.9.

Example 3

In this example, a treatment apparatus with the flowing carriers of 30 L and the fixed carriers of 120 L filled therein (i.e., the ratio of the fluidized bed to the fixed bed was 1:4) was used. As a result of treating the wastewater containing DMSO by the treatment apparatus of this example, the DMSO content in the treated water was 0.5 mg/L. The S-TOC concentration was 6 mg/L. Accordingly, the TOC removal rate was 97.0%. The pH of the apparatus in its region corresponding to the fluidized bed was 7.2, while the pH of the treated water was 7.1.

Example 4

In this example, a treatment apparatus with the flowing carriers of 75 L and the fixed carriers of 75 L filled therein (i.e., the ratio of the fluidized bed to the fixed bed was 1:1) was used. As a result of treating the wastewater containing DMSO by the treatment apparatus of this example, the DMSO content in the treated water was 12 mg/L. The S-TOC concentration was 10 mg/L. Accordingly, the TOC removal rate was 94.9%. The pH of the apparatus in its region corresponding to the fluidized bed was 7.2, while the pH of the treated water was 7.0.

Example 5

In this example, a treatment apparatus with the flowing carriers of 135 L and the fixed carriers of 15 L filled therein (i.e., the ratio of the fluidized bed to the fixed bed was 9:1) was used. As a result of treating the wastewater containing DMSO by the treatment apparatus of this example, the DMSO content in the treated water was 27 mg/L. The S-TOC concentration was 15 mg/L. Accordingly, the TOC removal rate was 92.4%. The pH of the apparatus in its region corresponding to the fluidized bed was 7.2, while the pH of the treated water was 7.1.

Example 6

In this example, a treatment apparatus with the flowing carriers of 142.9 L and the fixed carriers of 7.1 L filled therein (i.e., the ratio of the fluidized bed to the fixed bed was 20:1) was used. As a result of treating the wastewater containing DMSO by the treatment apparatus of this example, the DMSO content in the treated water was 48 mg/L. The S-TOC concentration was 22 mg/L. Accordingly, the TOC removal rate was 88.8%. The pH of the apparatus in its region corresponding to the fluidized bed was 7.2, while the pH of the treated water was 7.1.

Comparative Example 1

In this example, a treatment apparatus only with the fixed carriers of 150 L filled therein was used. As a result of treating the wastewater containing DMSO by the treatment apparatus of this comparative example, the DMSO content in the treated water was 105 mg/L. The S-TOC concentration was 33 mg/L. Accordingly, the TOC removal rate was 83.2%. The pH of the apparatus in its region corresponding to the fluidized bed was 7.8, while the pH of the treated water was 5.8.

Comparative Example 2

In this example, a treatment apparatus only with the flowing carriers of 150 L filled therein was used. As a result of treating the wastewater containing DMSO by the treatment apparatus of this comparative example, the DMSO content in the treated water was 113 mg/L. The S-TOC concentration was 41 mg/L. Accordingly, the TOC removal rate was 79.2%. The pH of the apparatus in its region corresponding to the fluidized bed was 7.0, while the pH of the treated water was 7.0.

As is apparent from the examples 1–6, and the comparative examples 1 and 2, the apparatus of the comparative examples 1 and 2 could reduce the DMSO content and S-TOC concentration in the treated water to some extent. However, the apparatus of these comparative examples could not exhibit a sufficient treatment capability. On the contrary, in the examples 1–6, both the DMSO content and S-TOC concentration in the treated water could be substantially reduced. Accordingly, the treatment capability of these examples is much higher than those of the comparative examples 1 and 2. Particularly, the example 3 with the ratio of the fluidized bed to the fixed bed being 1:4 exhibited the best TOC removal rate.

The pH of the upper region of the apparatus body and the pH of the treated water in the example 3 each were at a neutral value or its approximate value. On the contrary, in the comparative example 1, the pH of the treated water was turned to an acid pH, although the pH of the upper region of the fixed bed 2 in the apparatus body 1 was adjusted to be an alkaline pH. As is apparent from this fact, as the wastewater treatment proceeds within the fixed bed in the comparative example 1, sulfate radicals are generated, which results in lowering of the pH.

In summary, according to the arrangement of the present invention having the fixed bed and the fluidized bed being so arranged that wastewater containing organic sulfur compounds flows through the fluidized bed towards the fixed bed, microorganisms released from the flowing carriers are captured by the fixed bed, while the flowing carriers are subjected to a state where they are washed by a releasing agent within the wastewater and therefore have microorganisms easily releasable therefrom. Accordingly, the unintentional outflow of the released microorganisms and hence the decreasing in the amount of the microorganisms held on the carriers can be prevented as far as possible.

It is also possible to increase the amount of microorganisms held on the flowing carriers since microorganisms partly released from the fixed bed during the backwash operation are partly captured by the flowing carriers.

The combined use of the fixed bed and the fluidized bed enables microorganisms increased in the fluidized bed and then released from the flowing carriers to be captured in the fixed bed, and therefore prevented from flowing out of the apparatus, thereby omitting the necessity to additionally install a unit or mechanism for removing the microorganisms flown out of the apparatus.

The continuous flow of the flowing carriers within the fluidized bed enhances the contact efficiency of oxygen and wastewater to be treated, and therefore enables rapidly increase of microorganisms. This enhances the attachment of microorganisms on the surfaces of the flowing carriers, and releasing of excessive microorganisms from the flowing carriers, which microorganisms are in turn continuously fed to the fixed bed. Consequently, the amount of microorganisms held by the fixed bed is increased, so that the treatment capability in the entire apparatus is improved.

Further, according to the apparatus of the present invention enabling the downward flow of the wastewater to flow through the fluidized bed toward the fixed bed by the arrangement with the fluidized bed disposed on the fixed bed, microorganisms, suspended matters and the like built up on the surfaces of the fixed carriers of the fixed bed are released or scraped away by the flowing carriers flowing in the fluidized bed. As a result, the build-up of microorganisms on the surfaces of the fixed carriers is preferably prevented, thus achieving the increase in filtration resistance.

In the fluidized bed portion, DMSO is decomposed to some extent, and sulfuric acid is generated, thereby lowering the pH, variation of the pH in the fixed bed portion can be limited since the pH of the wastewater is adjusted to a value in a neutral range suitable for biological treatment by adding alkalis into the fluidized bed portion. Consequently, unlike the conventional apparatus, the pH within the apparatus body is stabilized even without the circulation of the treated water, and the inside of the fixed bed is brought into a condition facilitating the increase of microorganisms, so that a relatively high treatment capability can be preferably maintained.

Thus, the combined use of the fixed bed and the fluidized bed prevents the lowering of the pH in the fixed bed portion without inviting uneven distribution of the pH.

As a result of maintaining a higher treatment capability, the capability of decomposing organic sulfur compounds is unlikely to be deteriorated. Hence, odor is not generated even without the circulation of the treated water, as is done in the conventional method and apparatus.

This specification is by no means intended to restrict the present invention to the preferred embodiments set forth therein. Various modifications to the method and the apparatus for treatment of wastewater containing organic sulfur compounds, as described herein, may be made by those skilled in the art without departing from the spirit and scope of the present invention as defined in the appended claims.

What is claimed is:

1. A method for treatment of wastewater containing dimethyl sulfoxide comprising:
   introducing the wastewater containing dimethyl sulfoxide into an apparatus body equipped with a fixed bed and a fluidized bed arranged on said fixed bed, said fixed bed including fixed carriers adapted for the attachment of microorganisms and said fluidized bed including flowing carriers adapted for the attachment of microorganisms, a ratio of the flowing carriers to the fixed carriers being between 1:4 and 1:9; and
   directing the wastewater in a downward flow path so that the wastewater flows through the fluidized bed towards the fixed bed while being biologically treated by the fluidized bed and the fixed bed.

2. A method for treatment of wastewater containing dimethyl sulfoxide according to claim 1, further comprising:
   adjusting a pH of the wastewater within the fluidized bed.

3. A method for treatment of wastewater containing dimethyl sulfoxide according to claim 1, wherein at least one of the flowing carriers has a peripheral portion with a circular cross section surrounding a center portion and from 8 to 20 fins disposed on the peripheral portion.

4. A method for treatment of wastewater containing dimethyl sulfoxide according to claim 1, wherein at least one of the flowing carriers has a peripheral portion with a circular cross section surrounding a center portion and 8 fins disposed on the peripheral portion.

5. A method for treatment of wastewater containing dimethyl sulfoxide according to claim 1, wherein at least one of the flowing carriers has a peripheral portion with a circular cross section surrounding a center portion and 8 fins disposed on the peripheral portion equidistant from adjacent fins.

6. A method for treatment of wastewater containing dimethyl sulfoxide according to claim 1, wherein at least one of the flowing carriers has a peripheral portion surrounding a center portion and a plurality of fins disposed on the peripheral portion equidistant from adjacent fins.

7. A method for treatment of wastewater containing dimethyl sulfoxide according to claim 1, wherein at least one of the flowing carriers has a peripheral portion surrounding a center portion and a plurality of fins disposed on the peripheral portion a predetermined distance from adjacent fins.

8. A method for treatment of wastewater containing dimethyl sulfoxide according to claim 1, wherein each of the flowing carriers has a peripheral portion with a circular cross section surrounding a center portion and from 8 to 20 fins disposed on the peripheral portion.

9. A method for treatment of wastewater containing according to claim 1, wherein each of the flowing carriers has a peripheral portion surrounding a center portion and a plurality of fins disposed on the peripheral portion a predetermined distance from adjacent fins.

10. An apparatus for treatment of wastewater containing dimethyl sulfoxide comprising:

an apparatus body into which the wastewater containing dimethyl sulfoxide is introduced;

a fixed bed disposed within said apparatus body and provided therein with fixed carriers adapted for the attachment of microorganisms; and a fluidized bed disposed within the apparatus body and provided therein with flowing carriers adapted for the attachment of microorganisms, wherein said fluidized bed is arranged on said fixed bed to direct the wastewater in a downward flow path and to flow through the fluidized bed towards the fixed bed, and a ratio of the flowing carriers to the fixed carriers being between 1:4 and 1:9.

11. An apparatus for treatment of wastewater containing dimethyl sulfoxide according to claim 10, further comprising:

means for adjusting a pH of the wastewater within the fluidized bed.

12. An apparatus for treatment of wastewater containing dimethyl sulfoxide according to claim 10, wherein at least one of the flowing carriers comprises a peripheral portion with a circular cross section surrounding a center portion and from 8 to 20 fins disposed on the peripheral portion.

13. An apparatus for treatment of wastewater containing dimethyl sulfoxide according to claim 10, wherein at least one of the flowing carriers comprises a peripheral portion with a circular cross section surrounding a center portion and 8 fins disposed on the peripheral portion.

14. An apparatus for treatment of wastewater containing dimethyl sulfoxide according to claim 10, wherein at least one of the flowing carriers comprises a peripheral portion with a circular cross section surrounding a center portion and 8 fins disposed on the peripheral portion equidistant from adjacent fins.

15. An apparatus for treatment of wastewater containing dimethyl sulfoxide according to claim 10, wherein at least one of the flowing carriers comprises a peripheral portion surrounding a center portion and a plurality of fins disposed on the peripheral portion equidistant from adjacent fins.

16. An apparatus for treatment of wastewater containing dimethyl sulfoxide according to claim 10, wherein at least one of the flowing carriers comprises a peripheral portion surrounding a center portion and a plurality of fins disposed on the peripheral portion a predetermined distance from adjacent fins.

17. An apparatus for treatment of wastewater containing dimethyl sulfoxide according to claim 10, wherein each of the flowing carriers comprises a peripheral portion with a circular cross section surrounding a center portion and from 8 to 20 fins disposed on the peripheral portion.

18. An apparatus for treatment of wastewater containing dimethyl sulfoxide according to claim 10, wherein each of the flowing carriers comprises a peripheral portion surrounding a center portion and a plurality of fins disposed on the peripheral portion a predetermined distance from adjacent fins.

* * * * *